United States Patent
Toriyama et al.

(10) Patent No.: US 8,004,634 B2
(45) Date of Patent: Aug. 23, 2011

(54) LIQUID CRYSTAL DISPLAY DEVICE AND PROJECTION TYPE LIQUID CRYSTAL DISPLAY APPARATUS

(75) Inventors: Akiko Toriyama, Kanagawa (JP); Keisuke Matsui, Kanagawa (JP)

(73) Assignee: Sony Corporation, Tokyo (JP)

( * ) Notice: Subject to any disclaimer, the term of this patent is extended or adjusted under 35 U.S.C. 154(b) by 281 days.

(21) Appl. No.: 12/289,108

(22) Filed: Oct. 21, 2008

(65) Prior Publication Data

US 2009/0128720 A1    May 21, 2009

(30) Foreign Application Priority Data

Nov. 20, 2007   (JP) ................................. 2007-300145

(51) Int. Cl.
*G02F 1/1335* (2006.01)
(52) U.S. Cl. ....................................................... 349/106
(58) Field of Classification Search .................. 349/106, 349/108, 110, 145
See application file for complete search history.

(56) References Cited

U.S. PATENT DOCUMENTS

| | | | |
|---|---|---|---|
| 6,552,764 B2 * | 4/2003 | Fujioka et al. ................ | 349/106 |
| 7,626,660 B2 * | 12/2009 | Takizawa et al. ............. | 349/114 |
| 2006/0098033 A1 | 5/2006 | Langendijk | |
| 2009/0290080 A1 | 11/2009 | Horiuchi et al. | |

FOREIGN PATENT DOCUMENTS

| | | |
|---|---|---|
| JP | 59-230383 | 12/1984 |
| JP | 60-169827 | 9/1985 |
| JP | 04-316296 | 11/1992 |
| JP | 05-265045 A | 10/1993 |
| JP | 09-090343 A | 4/1997 |
| JP | 2002-250937 A | 9/2002 |
| JP | 2005-331841 A | 12/2005 |
| JP | 2006-519410 T | 8/2006 |
| WO | WO-2007/119454 A1 | 10/2007 |

OTHER PUBLICATIONS

Japanese Office Action issued Dec. 22, 2009 for corresponding Japanese Application No. 2007-300145.

* cited by examiner

*Primary Examiner* — James A Dudek
(74) *Attorney, Agent, or Firm* — Rader, Fishman & Grauer PLLC

(57) ABSTRACT

A liquid crystal display device and a projection type liquid crystal display apparatus are provided. The liquid crystal display device includes two substrates opposed each other, a liquid crystal layer arranged between the two substrates, a plurality of pixel electrodes arranged on the opposed surfaces of the substrates to form pixels in a matrix form, and alignment films formed on the two substrates to align liquid crystal of the liquid crystal layer in a predetermined direction. The pixels arranged in the matrix form have different spacings between the pixels.

13 Claims, 14 Drawing Sheets

| | | SPACING BETWEEN PIXELS [μm] | | |
|---|---|---|---|---|
| | | <1>RG | <2>GB | <3>BR |
| COMPARATIVE EXAMPLE <1> | <1>=<2>=<3> | 1 | 1 | 1 |
| | | 2 | 2 | 2 |
| COMPARATIVE EXAMPLE <2> | <1>=<2><<3> | 1 | 1 | 2 |
| COMPARATIVE EXAMPLE <3> | <1>=<3><<2> | 1 | 2 | 1 |
| EXAMPLE <1> | <2>=<3><<1> | 2 | 1 | 1 |
| EXAMPLE <2> | <3><<1>=<2> | 2 | 2 | 1 |
| EXAMPLE <3> | <2><<1>=<3> | 2 | 1 | 2 |
| COMPARATIVE EXAMPLE <4> | <1><<2>=<3> | 1 | 2 | 2 |

FIG. 11

| DISPLAY COLOR | | VISIBILITY | | INFLUENCE ON IMAGE QUALITY JUDGMENT (SENSORY EVALUATION) |
|---|---|---|---|---|
| | | ORIGINAL VISIBILITY | INFLUENCE OF POOR ALIGNMENT | |
| CYAN | BK GR BL | | GREEN LUMINANCE IS FLOATED | NG |
| MAGENTA | RD BK BL | | BLUE LUMINANCE IS FLOATED | OK |
| YELLOW | RD GR BK | | RED LUMINANCE IS FLOATED | OK |

1: ALMOST INVISIBLE    3: SOMEWHAT NOTICEABLE
2: NOT NOTICEABLE      4: NOTICEABLE  5: TERRIBLE

|  |  | SPACING BETWEEN PIXELS [μm] | | |
|---|---|---|---|---|
|  |  | <1>RG | <2>GB | <3>BR |
| COMPARATIVE EXAMPLE <1> | <1>=<2>=<3> | 1 | 1 | 1 |
|  |  | 2 | 2 | 2 |
| COMPARATIVE EXAMPLE <2> | <1>=<2><<3> | 1 | 1 | 2 |
| COMPARATIVE EXAMPLE <3> | <1>=<3><<2> | 1 | 2 | 1 |
| EXAMPLE <1> | <2>=<3><<1> | 2 | 1 | 1 |
| EXAMPLE <2> | <3><<1>=<2> | 2 | 2 | 1 |
| EXAMPLE <3> | <2><<1>=<3> | 2 | 1 | 2 |
| COMPARATIVE EXAMPLE <4> | <1><<2>=<3> | 1 | 2 | 2 |

FIG. 17

| | SPACING BETWEEN PIXELS [μm] | | | IMAGE QUALITY EVALUATION | | | INDEX INDICATING THAT GREEN IS FLOATED | CONTRAST |
|---|---|---|---|---|---|---|---|---|
| | | | | DISPLAY COLOR | | | | |
| | | <1>RG | <2>GB | <3>BR | CYAN | MAGENTA | YELLOW | | |
| COMPARATIVE EXAMPLE <1> | <1>=<2>=<3> | 1 | 1 | 1 | × | OK | OK | 1.83 | ◎ |
| | | 2 | 2 | 2 | OK | OK | OK | 0.25 | × |
| COMPARATIVE EXAMPLE <2> | <1>=<2><<3> | 1 | 1 | 2 | × | OK | OK | 1.84 | ○ |
| COMPARATIVE EXAMPLE <3> | <1>=<3><<2> | 1 | 2 | 1 | × | OK | OK | 1.86 | ○ |
| EXAMPLE <1> | <2>=<3><<1> | 2 | 1 | 1 | OK | OK | OK | 0.26 | ○ |
| EXAMPLE <2> | <3><<1>=<2> | 2 | 2 | 1 | OK | OK | OK | 0.24 | △ |
| EXAMPLE <3> | <2><<1>=<3> | 2 | 1 | 2 | OK | OK | OK | 0.25 | △ |
| COMPARATIVE EXAMPLE <4> | <1><<2>=<3> | 1 | 2 | 2 | × | OK | OK | 1.82 | △ |

FIG. 19

| | | SPACING BETWEEN PIXELS [μm] | | | IMAGE QUALITY EVALUATION | | | INDEX INDICATING THAT GREEN IS FLOATED | CONTRAST |
|---|---|---|---|---|---|---|---|---|---|
| | | <1>RG | <2>GB | <3>BR | DISPLAY COLOR | | | | |
| | | | | | CYAN | MAGENTA | YELLOW | | |
| COMPARATIVE EXAMPLE <1> | <1>=<2>=<3> | 1 | 1 | 1 | × | OK | OK | 2.02 | ○ |
| | | 2 | 2 | 2 | OK | OK | OK | 0.29 | × |
| COMPARATIVE EXAMPLE <2> | <1>=<2><<3> | 1 | 1 | 2 | × | OK | OK | 2.01 | ○ |
| COMPARATIVE EXAMPLE <3> | <1>=<3><<2> | 1 | 2 | 1 | × | OK | OK | 2.05 | ○ |
| EXAMPLE <1> | <2>=<3><<1> | 2 | 1 | 1 | OK | OK | OK | 0.31 | ○ |
| EXAMPLE <2> | <3><<1>=<2> | 2 | 2 | 1 | OK | OK | OK | 0.32 | △ |
| EXAMPLE <3> | <2><<1>=<3> | 2 | 1 | 2 | OK | OK | OK | 0.31 | △ |
| COMPARATIVE EXAMPLE <4> | <1><<2>=<3> | 1 | 2 | 2 | × | OK | OK | 2.03 | △ |

LIQUID CRYSTAL DISPLAY DEVICE AND PROJECTION TYPE LIQUID CRYSTAL DISPLAY APPARATUS

CROSS-REFERENCE TO RELATED APPLICATIONS

The present application claims benefit of priority of Japanese patent Application No. 2007-300145 filed in the Japanese Patent Office on Nov. 20, 2007, the entire disclosure of which is incorporated herein by reference.

BACKGROUND OF THE INVENTION

1. Field of the Invention

The present invention relates to a liquid crystal display device and a projection type liquid crystal display apparatus using the liquid crystal display device.

2. Description of Related Art

The projection type display apparatuses, such as liquid crystal projectors, are roughly classified into a three-plate type and a single-plate type.

As disclosed in, for example, Japanese Unexamined Patent Application Publication No. S60-169827, the three-plate type projector divides light emitted from a light source into red (R), green (G), and blue (B), and modulates these color lights by using three light bulbs constructed from liquid crystal display device (hereinafter referred to as "LCD"), and then recombines the modulated color light beams and enlarge-projects the recombined color light beams onto a projection surface. This system requires a large number of components including these three LCDs, which results in a cost increase.

On the other hand, the single-plate type projectors require a single LCD, thereby achieving a reduction in cost.

General single-plate type projectors employ a method of enlarge projecting onto a screen by using the color filters as disclosed in, for example, Japanese Unexamined Patent Application Publication No. S59-230383. The advantages of this method are a simple optical system configuration, low cost, and a compact in design.

However, the technique reduces efficiency in light usage due to the optical absorption or reflection of the color filters, thereby making it difficult to achieve high luminance. The technique may degrade the image quality since the color filters composed of resin or the like have poor light resistance.

To solve the drawbacks, the single-plate type display as disclosed in Japanese Unexamined Patent Application Publication No. H4-316296 has been proposed. Specifically, a light source is divided into light beams of red, green, and blue by a dichroic mirror, and these light beams are then entered into a micro lens array at different angles so as to be distributed into their corresponding display pixels.

This display system enables a considerable improvement of light utilization efficiency, thereby providing a display apparatus having a high luminance.

In terms of light resistance, no color filter is used, and a polyimide film and an inorganic film each having high light resistance are used as alignment films, making it possible to obtain a display apparatus having a long life.

As the light bulbs mounted on the liquid crystal projector and the like, an active-matrix LCD driven by thin film transistors (hereinafter referred to as TFTs) is generally used.

Nematic liquid crystal is used in almost of the active-matrix LCD. The display system thereof is, for example, twisted nematic (TN type) liquid crystal having a 90-degree twisted molecular orientation.

Recently, vertical alignment (VA type) liquid crystal elements are considered in order to achieve high luminance, high contrast, high definition, and long lifetime of liquid crystal projector apparatuses. The vertical alignment type liquid crystal display devices are applicable to both transmission type and reflection type, and it seems to become a mainstream liquid projector, as well as inorganic alignment films for achieving a long lifetime.

In two substrates each having an alignment film formed thereon, these alignment films are arranged opposite each other and bonded together by applying sealing material onto the periphery of a display area for displaying image data. A liquid crystal cell is manufactured by forming a spacer to control the substrate spacing and sealing liquid crystal thereinto. The liquid crystal is composed of several types of monolithic liquid crystal materials, which is also called liquid crystal composition. A liquid crystal display device is manufactured by mounting a polarizer on the manufactured liquid crystal cell.

SUMMARY OF THE INVENTION

In the recent years, liquid crystal light bulbs are also miniaturized along with the miniaturization of projection type display apparatuses such as liquid crystal projectors. On the other hand, the high definition and high luminance of pixels are advanced. The pixel pitch of liquid crystal display devices becomes smaller along with the tendency of high definition. Accordingly, the range of a light blocking portion is increasingly narrowed.

For example, when the substrate has a size of 22.9 mm (0.99 inches) and is of XGA (extended graphics array) type, the number of pixels is 1024×768, and the pixel pitch of each monochrome pixel is not more than 6.6 µm.

In the above-mentioned high definition device, an extremely large lateral electric field is generated between two adjacent pixel electrodes. It is unavoidable that the alignment defect of liquid crystal molecules is caused by the influence of the lateral electric field. This has become a serious problem in terms of image quality.

Consider the case of performing a display especially susceptible to the influence of lateral electric field, for example, the display of cyan color in the pixel array as shown in FIG. 1. To display the cyan color in normally white mode, the voltages of green and blue are changed with the voltage of red fixed at 5V and black display fixed.

The result is that, as shown in FIG. 2, the luminance in a green pixel is raised or floated considerably (i.e., the luminance is not completely achieved), thereby failing to produce the desired color and causing a significant degradation in image quality.

This phenomenon will be discussed below in simulation.

FIG. 3 is a diagram showing the simulation result, assuming a TN (twisted nematic) mode liquid crystal panel having an extremely narrow pitch of not more than 10 µm.

The symbol "<1>" in FIG. 3 represents the results of liquid crystal molecular alignment and transmissivity during a raster display when applying a 2 V to red, green, and blue pixels, respectively. The symbol "<2>" in FIG. 3 represents the results of liquid crystal molecular alignment and transmissivity during a cyan color display when applying a 5 V to a red pixel (R), a 2 V to a green pixel (G), and a blue pixel (B), respectively.

It is observed that the liquid crystal molecules of the green pixels during the cyan color display are not rising sufficiently than those during the raster display, so that the luminance level is floated. This seems to be due to the influence of the lateral electric field when the voltage applied to the red pixel is fixed at 5 V.

The simulation was conducted by using the 2D BENCH in the LCD MASTER, manufactured by SHINTECH, Inc. That is, pixels were arranged in parallel, and alternating drive was performed by setting the physical property values of liquid crystal (ne, no, elastic constants K11, K22, and K33, rotational viscosity coefficient, and dielectric constant) pretilt angle, twist angle, anchoring, polarizer angle, and analyzer angle.

Accordingly, it is desirable to provide a liquid crystal display device and a projection type liquid crystal display apparatus which are capable of preventing the degradation in image quality due to the influence of the lateral electric field, thereby exhibiting excellent display performance.

In accordance with one aspect of the present invention, there is provided a liquid crystal display device which includes two substrates opposed each other, a liquid crystal layer arranged between the two substrates, a plurality of pixel electrodes disposed on the opposed surfaces of the substrates so as to form pixels in a matrix form, and alignment films formed on the two substrates in order to align the liquid crystal of the liquid crystal layer in a predetermined direction. The pixels arranged in the matrix form have different spacing between the pixels.

In accordance with another aspect of the present invention, there is provided a projection type liquid crystal display apparatus which includes a light source, a liquid crystal display device, and a light collecting optical system that divides light emitted from the light source into color lights including of red light, green light, and blue light each having different primary wavelengths, and guides the lights into the liquid crystal display device. The liquid crystal display device includes two substrates opposed each other, a liquid crystal layer arranged between the two substrates, a plurality of pixel electrodes disposed on the opposed surfaces of the substrates to form pixels in a matrix form, and alignment films formed on the two substrates to align liquid crystal of the liquid crystal layer in a predetermined direction. The pixels arranged in the matrix form are formed to have different spacing between the pixels.

The pixel arranged in the matrix form may have a pixel unit composed of three pixels including of a first pixel, a second pixel, and a third pixel corresponding to red, green, and blue, respectively. The first pixel, the second pixel, and the third pixel may be formed so that spacings among the first, second, and third pixels are different from one another.

A spacing between a pixel corresponding to green display and a pixel adjacent thereto in an alignment direction may be larger than any other spacing between the pixel electrodes.

When the second pixel is a green pixel, a spacing RG between a red pixel and the green pixel may be larger than a spacing GB between the green pixel and a blue pixel, and a spacing BR between the blue pixel and the red pixel.

Liquid crystal used for the liquid crystal layer may have a refractive index anisotropy of not less than 0.10 at a room-temperature, and the liquid crystal layer may have a thickness of not more than 4 μm.

A liquid crystal panel provided with the pixel electrodes may be a transmission type.

Monochrome pixels may have a pixel pitch of not more than 20 μm.

The alignment films may be composed of inorganic alignment films.

According to embodiments of the present invention, by optimizing inter-pixel spacing, the abnormal alignment or the like to be occurred in a certain pixel becomes less visible, thereby achieving high quality image.

Embodiments of the present invention can achieve a high-quality image.

In the projection type LCDs such as projectors, it becomes possible to achieve a high aperture ratio by reducing the panel size or enlarging the effective pixel region. This realizes high productivity and high yield by the cell gap control. Inorganic materials can be used without deteriorating image quality, thereby leading to a long lifetime.

BRIEF DESCRIPTION OF THE DRAWINGS

FIG. 11 is a diagram showing the visibility of individual colors and the degree of influence on image quality;

FIG. 16 is a diagram showing the experimental conditions of Example 1;

FIG. 17 is a diagram showing the evaluation results of Example 1;

FIG. 19 is a diagram showing the evaluation results of Example 2.

DETAILED DESCRIPTION OF EMBODIMENTS

Embodiments of the invention will be described below with reference to the accompanying drawings.

Figure 1:
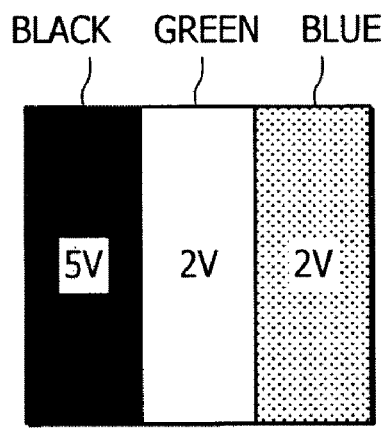
FIG. 1 is a view showing a cyan color display according to an embodiment of the present invention.
Figure 2:
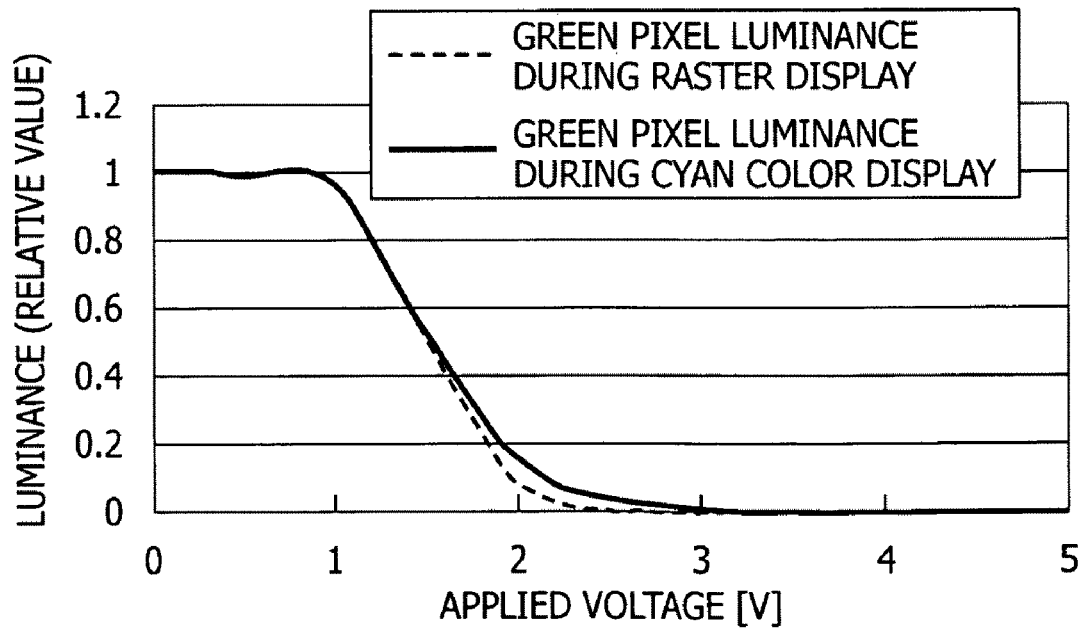
FIG. 2 is a diagram showing the state in which the green pixel luminance is floated.
Figure 3:
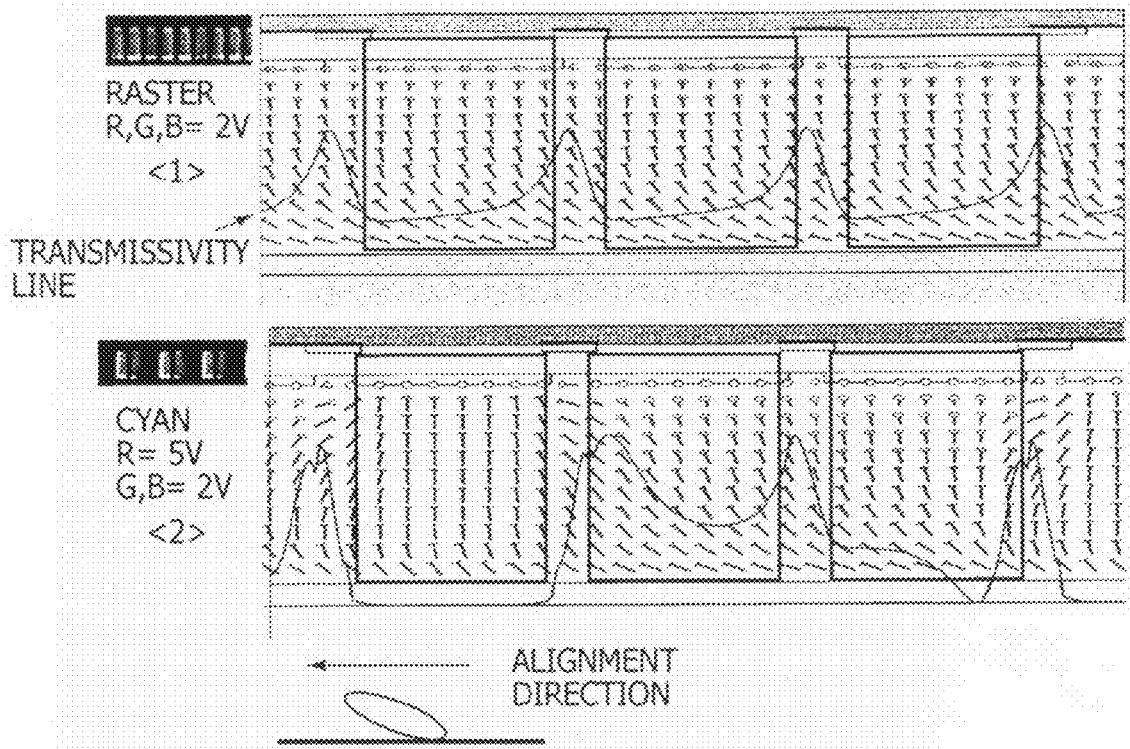
FIG. 3 is a view showing the result of a simulation regarding a crystal molecular.
Figure 4:
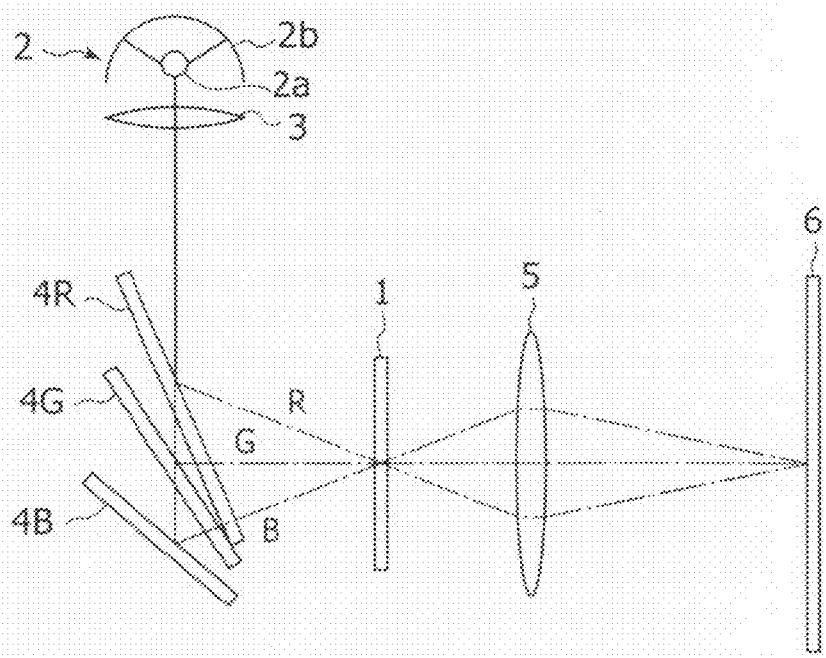
FIG. 4 is a block schematic diagram showing a projection type display apparatuses employing a liquid crystal display device according to an embodiment of the invention.

FIG. 4 is a block schematic diagram showing an example of projection type display apparatuses employing a liquid crystal display device according to an embodiment of the invention.

As shown in FIG. 4, a projection type display apparatus PRJ of the present embodiment is composed mainly of a liquid crystal display device 1, a light source section 2, a condenser lens 3, dichroic mirrors 4R, 4G, and 4B, a projection lens (a projection optical system) 5, and a projection screen 6.

Figure 5A:
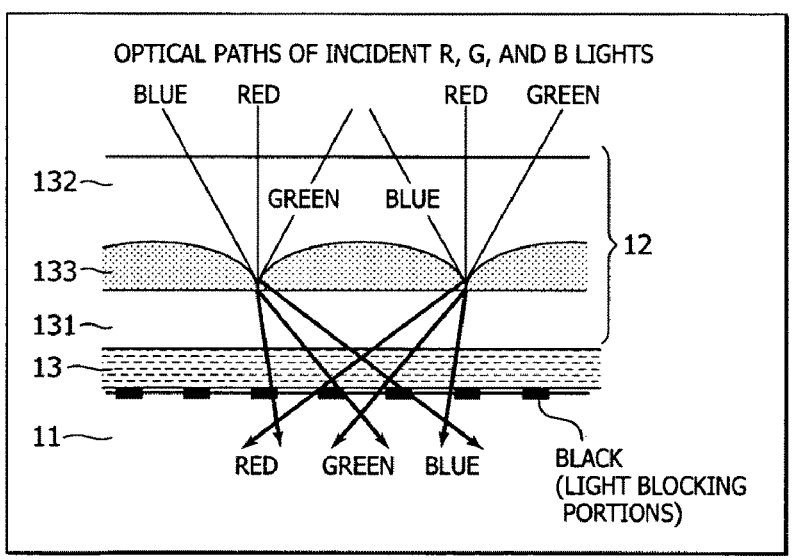
FIGS. 5A and 5B are diagrams showing schematically the configuration including a micro lens array of the liquid crystal display device according to an embodiment of the present invention.
Figure 5B:
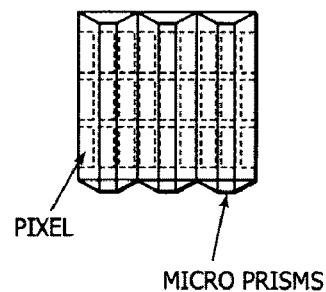

In the liquid crystal display device 1, as shown in FIGS. 5A and 5B, a liquid crystal layer 13 is held (sealed) between a transparent TFT array substrate 11 and an opposed substrate 12 which is a transparent micro lens array substrate. In the opposed substrate 12, a micro lens array 133 is formed so as to be held between a cover glass 131 adjacent to the liquid crystal layer 13 and a base glass 132 adjacent to the light incident side. The configuration of the liquid crystal display device 1 will be described in more detail later.

The light source 2a of the light source section 2 in the present embodiment is a high-pressure mercury arc lamp. Alternatively, other lamps such as a metal halide lamp, a halogen lamp or a xenon lamp may be used.

A spherical mirror 2b is arranged on the back of the white light source 2a, and the condenser lens 3 is arranged on the front thereof in order to change the light of the white light source into parallel light.

Dichroic mirrors 4R, 4G, and 4B, which are color separation optical systems as color separation means for separating a light beam into red, green, and blue, are mounted in front of the condenser lens 3 (on the light emitting side) The dichroic mirrors 4R, 4G, and 4B that are the color separation optical systems have characteristics of selectively reflecting the lights in the wavelength bands of red, green, and blue, and transmitting other lights.

The red dichroic mirror 4G reflects visible lights having a wavelength of approximately not less than 600 nm, and the blue dichroic mirror 4B reflects visible lights having a short wavelength of less than 500 nm. The green dichroic mirror 4G reflects visible lights in the range of approximately 570 to 500 nm.

By the arrangement of the dichroic mirrors, the light in the red wavelength range is reflected from the red dichroic mirror 4R and entered into the micro lens array 133 of the liquid crystal display device 1. The light in the green wavelength range is transmitted through the red dichroic mirror 4R and reflected from the green dichroic mirror 4G, and then retransmitted through the red dichroic mirror 4R and entered into the micro lens array 133 at a different angle.

The light in the blue wavelength range is transmitted through the red and green dichroic mirrors 4R and 4G, and then reflected from the blue dichroic mirror 4B, and retransmitted through the red and green dichroic mirrors 4R and 4G, and then entered into the micro lens array 133 at a different angle.

Thus, the light from the single white light source 2a is separated into the three color lights and entered into the micro lens array 133 from the three directions.

The configuration of the liquid crystal display device 1 according to the present embodiment will be described below in more detail.

Figure 6:
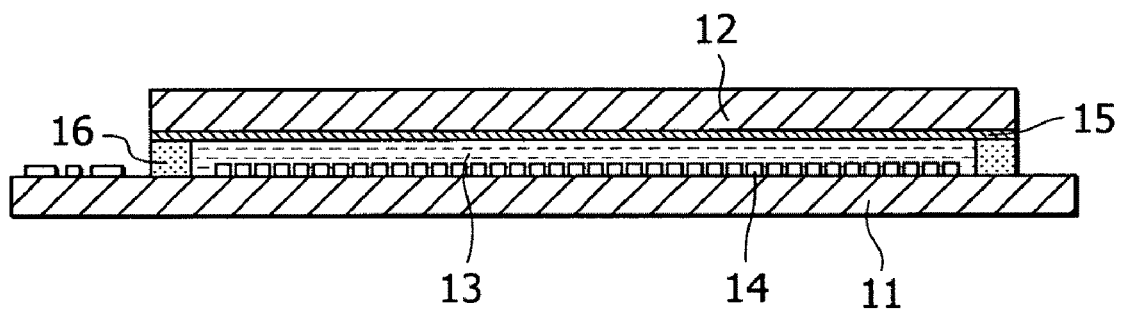
FIG. 6 is a diagram showing schematically the configuration of an active matrix type liquid crystal display device according to an embodiment of the present invention.

FIG. 6 is a diagram showing schematically the configuration of the active matrix type liquid crystal display device according to the present embodiment.

As shown in FIG. 6, the liquid crystal display device 1 includes the TFT array substrate (a substrate on which an active element is formed) 11, and the opposed substrate 12 which is a transparent micro lens array substrate arranged opposite to the TFT array substrate 11.

For example, when the TFT array substrate 11 is a transmission type substrate, pixel electrodes 14 are provided thereon. The pixel electrodes 14 are formed by a transparent conductive thin film such as an indium tin oxide (ITO) film.

The ITO film (the opposed electrode) 15 is deposited on the whole surface of the opposed substrate 12.

An alignment film (not shown) for aligning liquid crystal in a predetermined direction is formed on the TFT array substrate 11 and the opposed substrate 12, respectively. For example, a liquid crystal layer 13 is held (sealed) between a pair of substrates with a sealing material 16 so that the alignment films are opposed to each other with a predetermined spacing therebetween.

Figure 7:
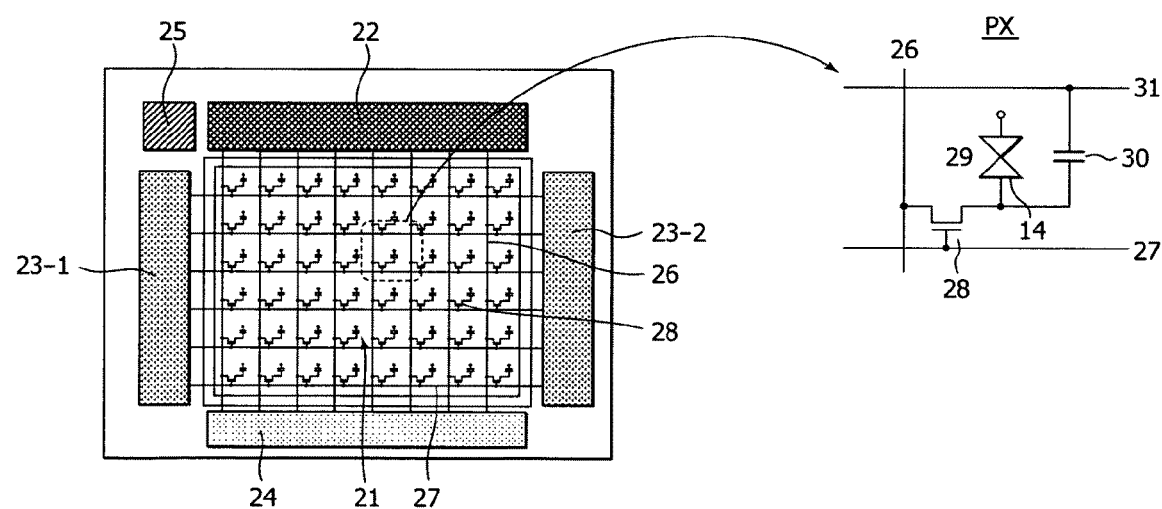
FIG. 7 is a diagram showing an example of an arrangement of an array substrate (a liquid crystal panel section) of the active matrix type liquid crystal display device according to an embodiment of the present invention.

FIG. 7 is a diagram showing an example of the arrangement of the active matrix type liquid crystal display device on an array substrate (a liquid crystal panel section) in the present embodiment.

As shown in FIG. 7, a liquid crystal display device 1A includes a pixel display are 21 having pixels arranged in an array form, a horizontal transfer circuit 22, vertical transfer circuits 23-1 and 23-2, a pre-charge circuit 24, and a level conversion circuit 25.

In the pixel display region 21, a plurality of data lines 26 and a plurality of scanning lines (gate wirings) 27 are arranged in a lattice form. One end of each of the data lines 26 is connected to the horizontal transfer circuit 22, and the other end is connected to the pre-charge circuit 24. The ends of the individual scanning lines 27 are connected to the vertical transfer circuits 23-1 and 23-2, respectively.

A pixel switching transistor 28 to control switching, a liquid crystal 29 and an auxiliary capacity (a storage capacity) 30 are formed on each of a plurality of pixels PX formed in a matrix form, which constitute the pixel display area 21 of the liquid crystal display device 1A.

The individual data lines 26 are electrically connected to the source of the transistor 28 to supply a pixel signal to be written. The scanning lines 27 are electrically connected to the gates of the transistors 28 and configured to apply a scanning signal pulse-likely to the scanning lines 27 at a predetermined timing.

The individual pixel electrodes 14 are electrically connected to the drains of the transistors 28. By turning on the switches of the transistors 28 as switching elements for a certain period of time, the pixel signals supplied from the data lines 26 are written at a predetermined timing.

The pixel signals each having a predetermined level are written in the liquid crystal 29 through the pixel electrodes 14, and then retained in between the opposed electrode formed on the opposed substrate 12 for a certain period of time. Depending upon the voltage level applied, the alignment or order of molecular aggregation in the liquid crystal 29 is changed to enable light modulation and gray scale display.

In a normal white display, incident light can be transmitted through the liquid crystal portion depending upon the applied voltage, and the light having the contrast corresponding to the pixel signal as a whole can be emitted from the liquid crystal display device.

For the purpose of preventing the held pixel signal from being leaked, the auxiliary capacity (the storage capacity) 30 is added in parallel with a liquid crystal capacity formed between the pixel electrode and the opposed electrode. This further improves data holding characteristics and achieves the liquid crystal display device having a high contrast ratio.

A resistance common wire 31 is provided to form the auxiliary capacity (the storage capacity) 30.

Figure 8:
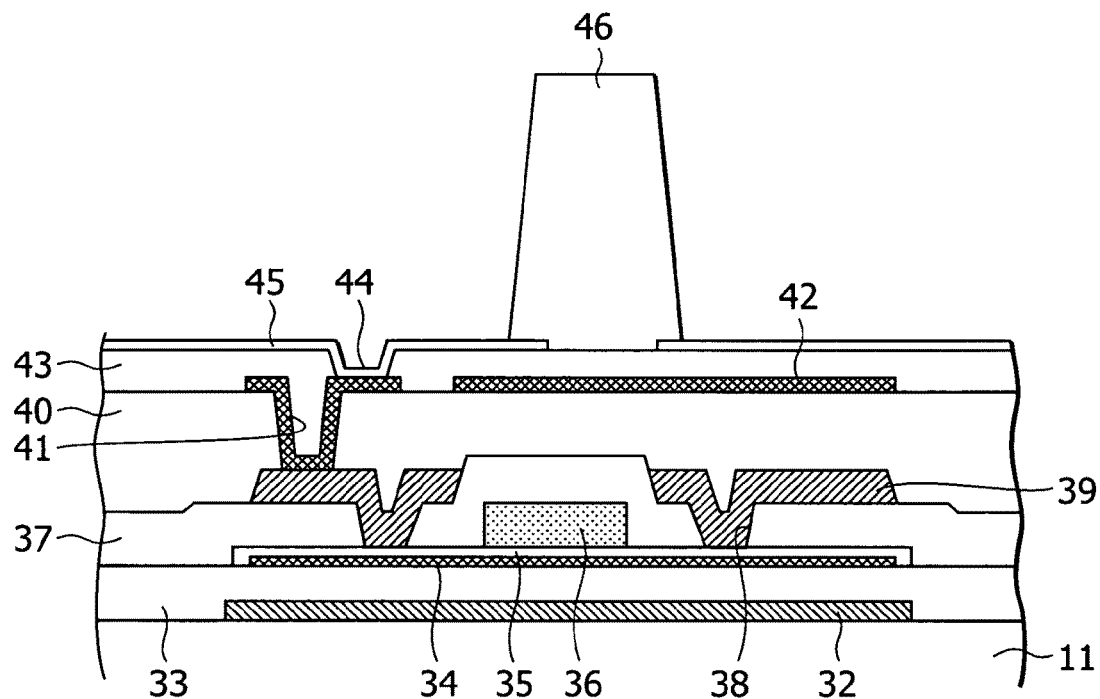
FIG. 8 is a sectional view showing a specific configuration example of the active matrix liquid crystal display device according to an embodiment of the present invention.

FIG. 8 is a sectional view showing a specific configuration example of the active matrix liquid crystal display device in the present embodiment.

A method of manufacturing the active matrix type liquid crystal display device according to the present embodiment will be described with reference to FIG. 8.

Firstly, as a first light blocking film 32, a high melting point metal (WSi is used in the present embodiment) is formed on the TFT array substrate 11 composed of quartz.

Subsequently, SiO2 is deposited as a first interlayer film 33, a polycrystalline Si film (p-Si) 34 is formed by CVD method, and then the resultant layers are subjected to pattern formation by etching.

Subsequently, a gate insulating film 35 is formed, a gate electrode 36 of polycrystalline Si film (p-Si) is formed, and then the resultant layers are subjected to pattern formation by etching.

Subsequently, a second interlayer film 37 of SiO2 is deposited, and source/drain electrode of a first contact 38 is formed.

As a first wiring film 39, a metal material (Al in the present embodiment) is formed by film forming method, such as sputtering, followed by etching for patterning.

Subsequently, a third interlayer film 40 of SiO2 is deposited, and a second contact 41 is formed. Thereafter, a second light blocking film 42 of a metal film (Ti in the present embodiment) is formed.

Then, a fourth interlayer film 43 of SiO2 is deposited, and a third contact 44 is formed. Thereafter, a transparent electrode 45 of an ITO is formed.

A transparent resist layer is formed, which becomes a columnar spacer 46.

A photoresist is coated in a predetermined thickness on the substrate and exposed to ultraviolet light irradiation using a photomask. Thereafter, development and burning are performed to form the columnar spacer 46, which is arranged at a desired position between the pixel electrodes adjacent to each other.

Next, the TFT array substrate 11 and the opposed substrate 12 thus manufactured are cleaned.

An alignment film is formed on the individual substrates, respectively.

Then, rubbing is performed to obtain a predetermined alignment. Except for an injection port, a seal pattern is formed and a liquid crystal composition is injected therethrough.

In the liquid crystal display devices 1 and 1A thus manufactured according to the present embodiment, the pixel arranged in the matrix form are formed to have different spacing between the pixels as described below, so that the degradation in image quality due to the influence of the lateral electric field is prevented. As a result, abnormal alignment or the like occurred in a certain pixel becomes less visible, thereby enabling the liquid crystal display devices 1 and 1A to obtain high quality images.

The spacing between pixels in the liquid crystal display devices 1 and 1A will be described below.

Figure 9:
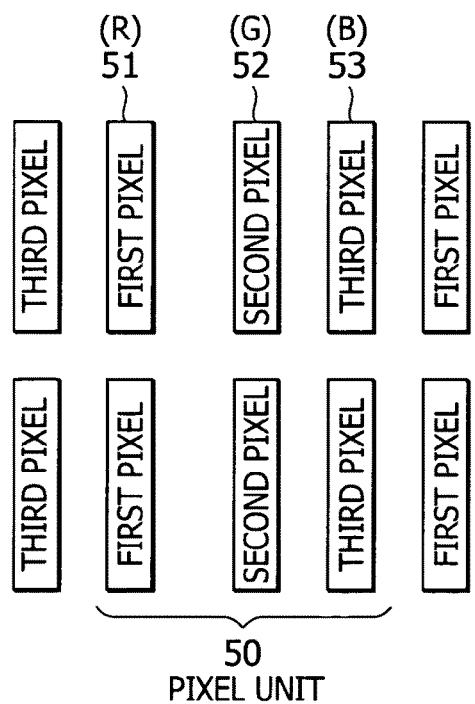
FIG. 9 is a diagram explaining the configuration in units of pixels according to an embodiment of the present invention.

In the liquid crystal display devices 1 and 1A, for example, as shown in FIG. 9, a pixel unit 50 is a three-pixel unit including of a first pixel 51, a second pixel 52, and a third pixel 53. The three pixels 51, 52, and 53 are formed so that spacings among the first, second, and third pixels are different from one another.

Figure 10:
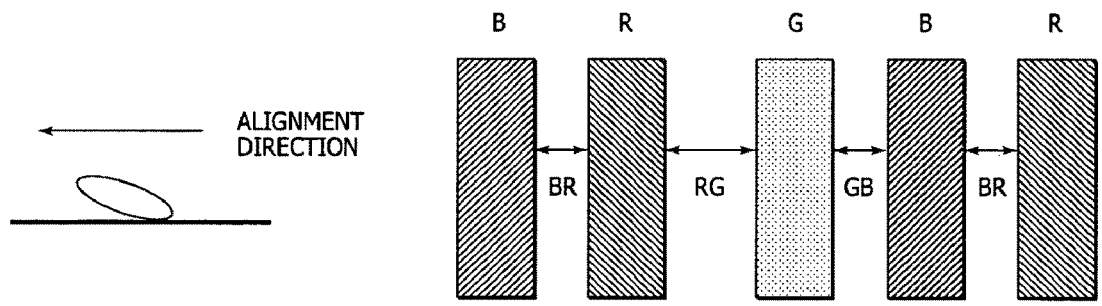
FIG. 10 is a diagram explaining the relationship between alignment direction and inter-pixel spacing.

For example, as shown in FIG. 10, the spacing between the pixel corresponding to a green display (the second pixel 52) and the pixel adjacent thereto in the alignment direction is larger than any other spacing between the pixel electrodes.

More specifically, when the second pixel is a green pixel G, a RG denotes spacing between a red pixel R and the green pixel G, a GB denotes spacing between the green pixel G and a blue pixel B, and a BR denotes spacing between the blue pixel B and the red pixel R, the spacing RG is larger than the spacing GB and the spacing BR (RG≧GB≧BR).

The spacing between pixels will be further considered below.

As a design parameter to overcome the alignment defect due to the lateral electric field, it is effective to reduce cell gap and enlarge the spacing between adjacent pixel electrodes.

FIG. 11 is a diagram showing the original display colors and the visibility when pixels are subjected to the influence of alignment defect, in a case where cyan, magenta, and yellow colors are displayed by a red-green-blue arrangement.

As shown FIG. 11, the influence on image quality of cyan color is "NG (unsatisfactory)" whereas the influence on image quality of magenta and yellow are "OK (satisfactory)". Thus, a significant influence is observed only in the image quality of cyan color. This is because under application of an electric field, the luminance in adjacent pixel is floated, thereby failing to obtain the original display color.

Figure 12:
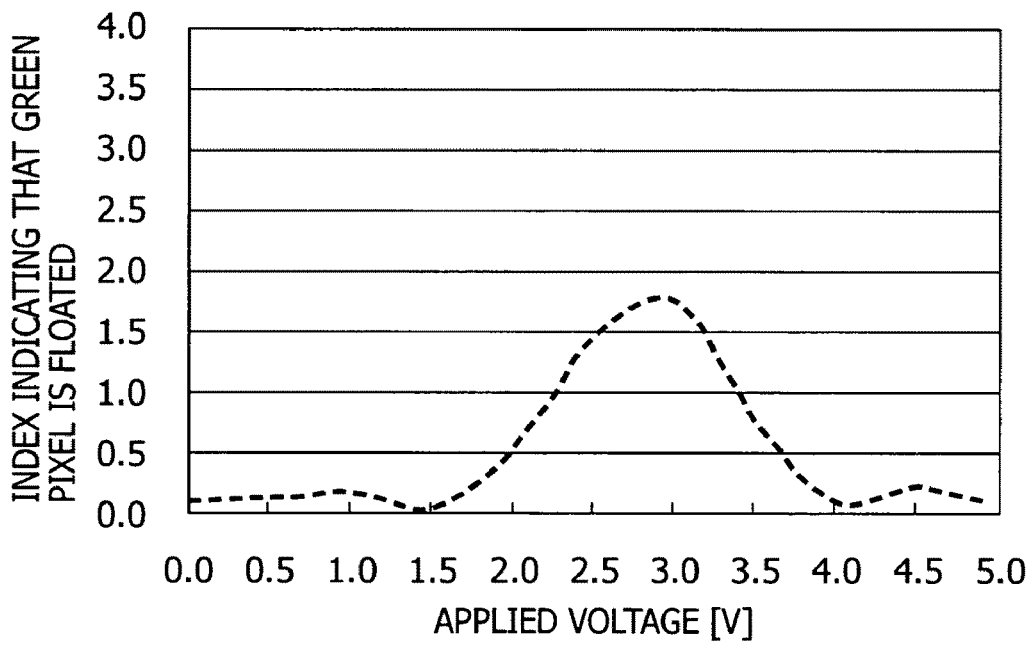
FIG. 12 is a diagram showing the voltage dependence of the float in green pixel luminance.

FIG. 12 is a diagram showing the results plotted by setting as follows: Index=|1−(Green pixel luminance when cyan color is produced/Ideal luminance of green pixel)|, in order to quantify the float in green pixel luminance, and making measurements in a voltage range of 0 to 5 V.

Figure 13:
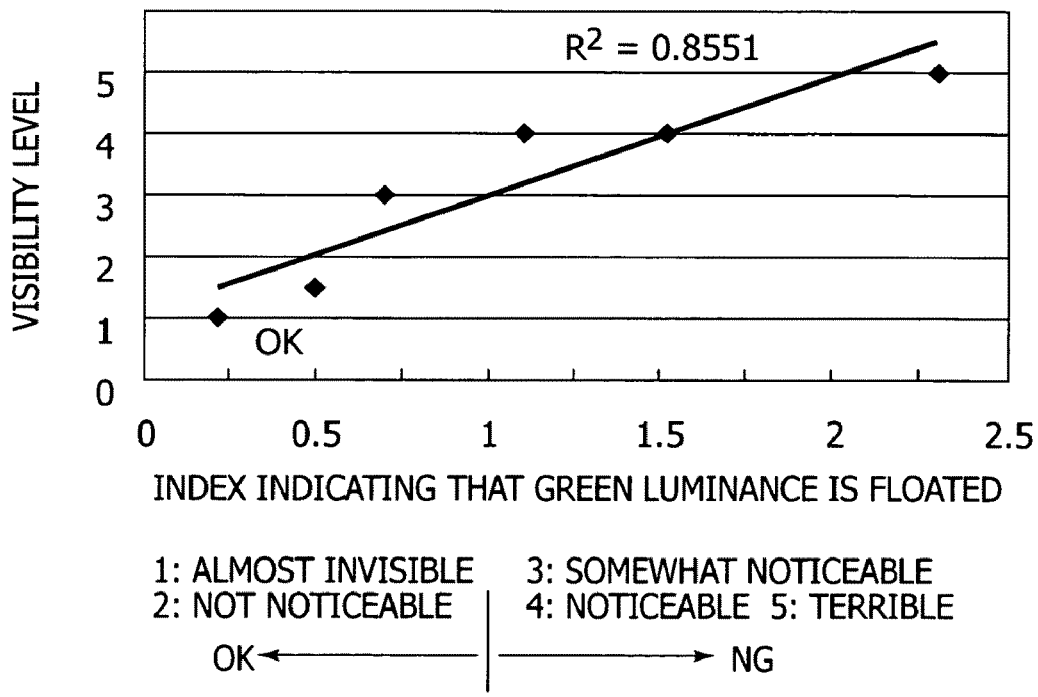
FIG. 13 is a diagram showing the relationship between the float in green pixel luminance and pixel evaluation.

It is apparent from FIG. 12 that the luminance in green is greatly floated in the vicinity of a middle tone. Consequently, FIG. 13 shows the relationship between the index value of the float in green pixel luminance at the voltage of 2 V and the image quality evaluation at the same voltage. The image quality evaluation is the average value of twenty test subjects. It can be seen that there is a strong correlation between the floated luminance in green and the image quality evaluation.

On the other hand, it can be seen that a little or no influence is observed in the image qualities of magenta and yellow. The reason is related to the spectral luminous efficacy of human being. Among red, green, and blue pixels, the green pixel visibility is considerably outstanding. This is because the human eye interprets brightness differently depending upon the wavelength of light.

Figure 14:
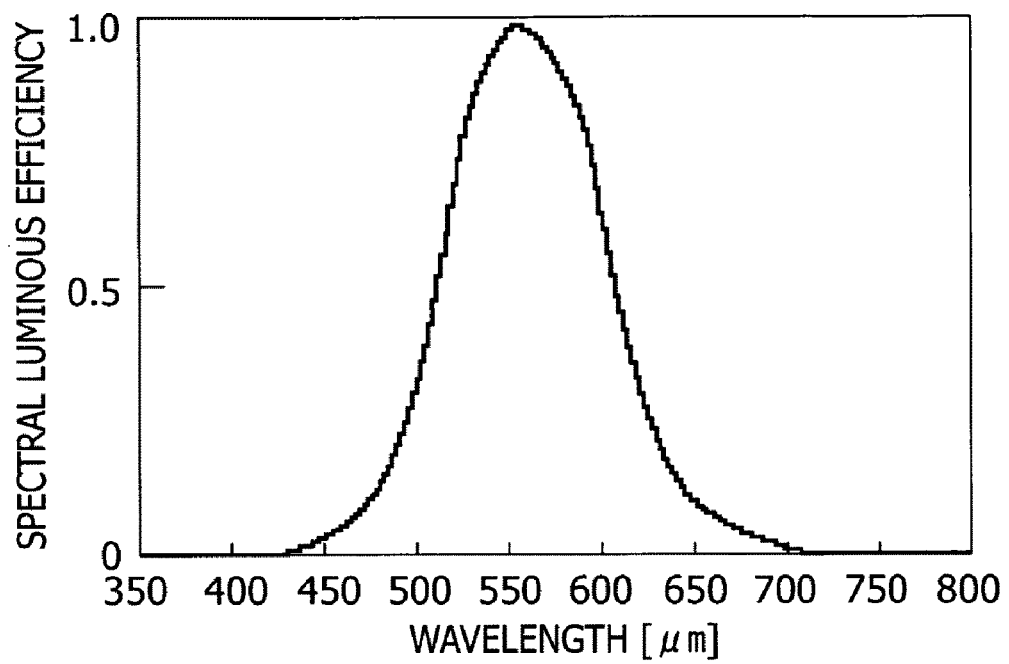
FIG. 14 is a diagram showing the spectral luminous efficiency of photopic vision of CIE standard photometrical observer.

In general, the brightness sensing is called luminous efficacy, and the human eye is most sensitive to the light having a wavelength 555 nm, as presented by the luminous efficiency of photopic vision of CIE standard photometrical observer in FIG. 14.

It is therefore desirable to control the influence of the lateral electric field of green pixels on luminance. The lateral electric field can be controlled by enlarging ITO spacing and narrowing cell gap. However, the enlarged ITO spacing may introduce several problems. The first problem is that aperture ratio is lowered and brightness is lowered by the necessity of enlarging the light blocking region. The second problem is that due to enlarged ITO spacing, the alignment control of liquid crystal molecules is degraded and the contrast is lowered by light leakage and the like.

In view of the foregoing considerations, because image quality is greatly influenced only when the luminance in green pixel G is floated, the problems can be minimized by especially enlarging the spacing between pixels adjacent to the green pixel G. This prevents the image quality defect due to the problem.

The followings are reasons why the second pixel 52 is the green pixel G in the present embodiment.

When the second pixel 52 is red (R), color mixing is vulnerable to occur because the light intensity of a red band is generally weaker than that of other colors. The term "color mixing" means the phenomenon that, in the configuration of the projection type liquid crystal display apparatus, the individual light beams enter into somewhere other than the desired display pixel, that is, the light beams of the first pixel 51 and the third pixel 53, except for the second pixel 52, enter into a part of the second pixel and cause a color mixing.

When the second pixel 52 is blue (B), the image quality deficiencies at the sealed ends is easily recognizable. The ends of pixels (the pixels closest to the sealed ends) are vulnerable to image defect. It is therefore possible to improve yield and quality by arranging the blue that facilitates recognition of defects.

The liquid crystal display devices 1 and 1A having the characteristic spacing between pixels as described above are suitably applied to, for example, transmission type liquid crystal panels.

Particularly when rubbing is employed for alignment control, the alignment control around the spacer is extremely difficult due to the existence of gaps. The present embodiment may be extremely effective in the alignment control method using rubbing.

The liquid crystal used in the liquid crystal layer has a refractive index anisotropy of not less than 0.10 at a room-temperature, and the cell gap is not more than 4 µm.

The pixel pitch of the liquid crystal display devices is not more than 20 µm, and the alignment films may be composed of inorganic alignment films.

Especially, liquid crystal projectors are narrow-pitch high-definition devices and used for further enlarged projection, so that an abnormality in the image quality is rather noticeable.

There are considerable difficulties in overcoming the alignment disorder due to the reverse tilt domain caused by the above-mentioned lateral electric field. It is also effective to prevent the influence of the lateral electric field by narrowing gap, namely, reducing the cell gap to enhance the vertical electric fields of the TFT array substrate and the opposed substrate.

For achieving a narrow gap, it is extremely effective for gap control that selective spacers are formed especially at the light blocking portion. For obtaining the maximum transmissivity characteristic, the refractive index anisotropy Δn needs to be increased when the above-mentioned step of reducing cell gap is taken.

For example, when a TN alignment cell is positioned under a crossed nicol (the transmissivity when the voltage is turned off in a TN alignment), the result is as follows.

$$T=1-(\sin 2((1+u2)^{1/2} \times \pi/2))/(1+u2)$$

$$U=2\Delta nd/\lambda$$

The result becomes maximum (Max) when $(1+u2)^{1/2}=2n$.
The result becomes maximum (Max) when $\Delta nd=(4n2-1)^{1/2} \times (\lambda/2)$.

Accordingly, the following relationship is obtained.

$$1st \Delta nd = \sqrt{3} \times (\lambda/2)$$

From the above equation, the maximum transmissivity design in the green light (550 nm) is $\Delta nd=0.48$ µm. For example, the cell gap of not more than 4 µm requires $\Delta n=0.12$ or more.

Meanwhile, inorganic alignment films capable of achieving high light resistance and long lifetime, which are advantageous for use as projectors, have also been considered recently. The inorganic alignment film materials usually have a smaller alignment regulation force and more susceptible to electric field force than organic materials such as normal polyimide. Consequently, the effectiveness of the present embodiment can be exhibited.

The followings are examples of the invention.

EXAMPLE 1

Figure 15:
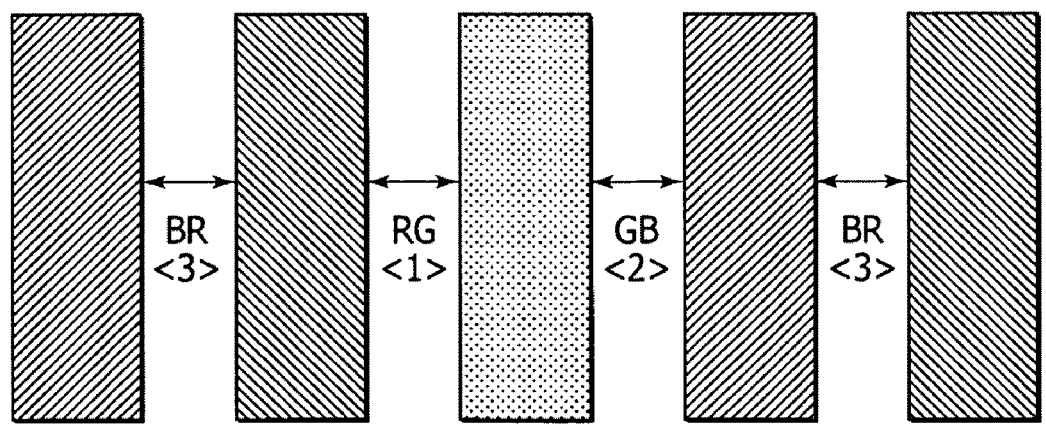
FIG. 15 is a diagram showing a general ITO pattern form.

FIG. 15 is a diagram showing a general ITO pattern form. FIG. 16 is a diagram showing the test conditions of Example 1. FIG. 17 is a diagram showing the evaluations results of Example 1.

The general ITO pattern form was patterned by etching, as shown in FIG. 15.

Subsequently, a transparent resist layer serving as the columnar spacer 46 was formed.

As a photoresist, a PMER (manufactured by Tokyo Ohka Kogyo Co., Ltd.) was coated in a thickness of 3 µm on a substrate by spin coating method, and then exposed to ultraviolet light irradiation using a photomask. Thereafter, development and burning were performed to form the columnar spacer 46 having a diameter of approximately 1.5 µm. The obtained ITO form is as shown in FIG. 15.

As shown in FIG. 16, there were formed ITOs corresponding to all the combinations obtained among two ITO spacing of 1 µm and 2 µm and three conditions of <1>between R and G, <2>between G and B, and <3>between B and R.

Subsequently, the TFT array substrate 11 and the opposed substrate 12 were cleaned.

Alignment films were formed on the substrates, respectively. As the alignment films, an organic material composed of polyimide was used and coated in a thickness of 50 nm by spin coating. This was prebaked and then postbaked on a hot plate.

Rubbing was then performed to form a seal pattern extending except for an injection port, and a liquid crystal composition was injected therethrough. The refractive index anisotropy Δn of the used liquid crystal composition was 0.16 at the room temperature so as to have a theoretical maximum value in the transmissivity of green light at a gap of 3 µm.

The following evaluations were conducted on the manufactured liquid crystal devices.

[1] Image Quality Evaluation

The evaluation results will be described with reference to FIG. 17.

Cyan, magenta, and yellow colors were displayed on the liquid crystal display devices under the individual conditions.

In the image quality evaluation, the image having substantially the same visibility as the original color (the ideal color) was defined as "OK", and the image having a different visibility was defined as "NG(x)".

In Comparative Example <1>, all of the liquid crystal display devices having ITO spacing of 2 µm were OK. In those having ITO-to-ITO spacing of 1 µm, only the cyan color was NG.

Examples <1> to <3> according to the embodiment, each having the RG spacing of 2 µm, were all OK.

In other Comparative Examples, only the cyan color was NG.

In FIG. 17, the symbols "⊚", "○", "Δ", and "×" in the CONTRAST column indicate "very good", "good", "permissible", and "unsatisfactory", respectively.

Figure 18A:
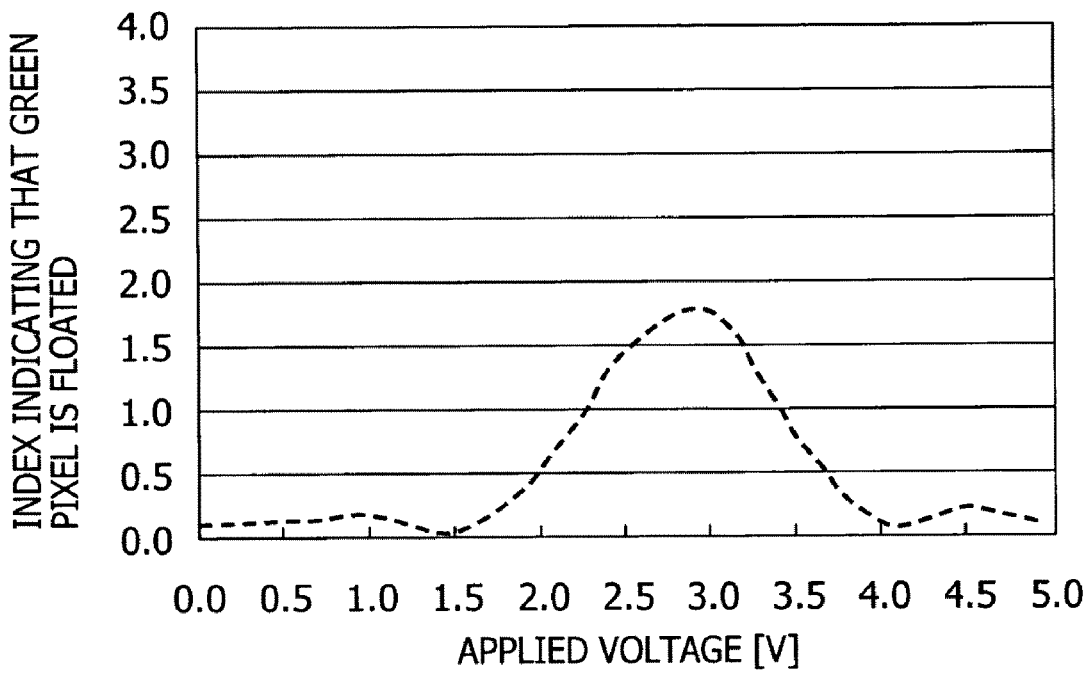
FIGS. 18A and 18B are diagrams showing the relationship between applied voltage and the index indicating that the green pixel luminance is floated.
Figure 18B:
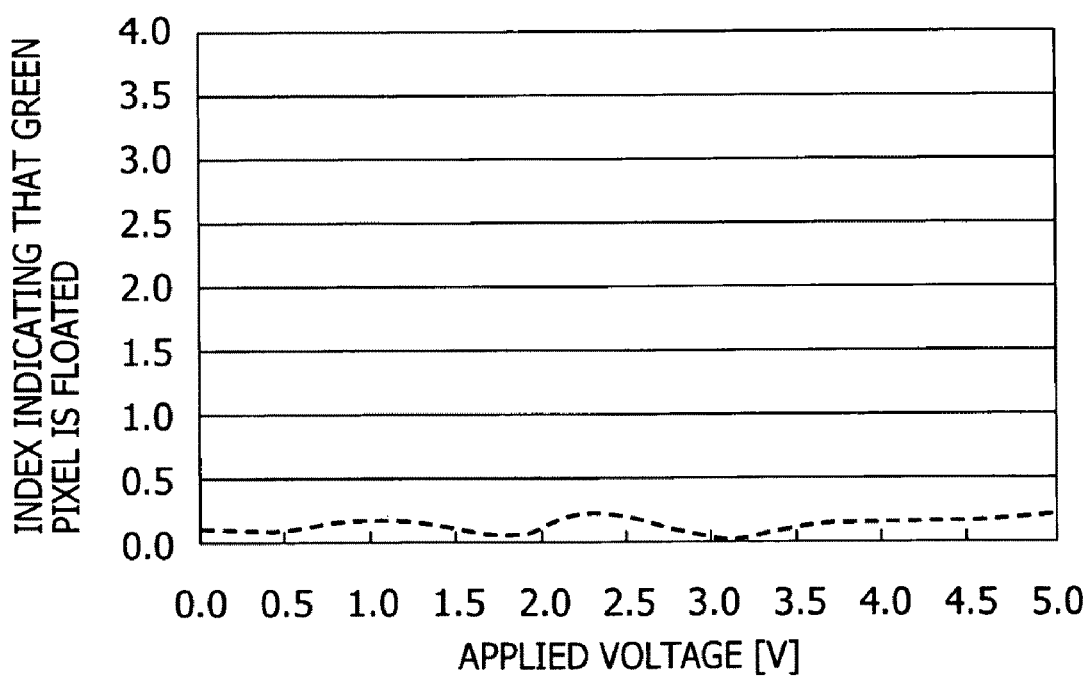

It was found that the float of green pixel luminance has a great influence upon image quality. In order to quantify this, as shown in FIGS. 18A and 18B, the ratio indicated by Index=|1−(Green pixel luminance when cyan color is produced/Ideal luminance of green pixel)| was used as an index indicating the floated luminance in green. FIG. 18A shows the relationship between applied voltage and the index indicating that the green pixel luminance is floated, before the design optimization of ITO. FIG. 18B shows the relationship between applied voltage and the index indicating that the green pixel luminance is floated, after the design optimization of ITO. In a voltage range of 0 to 5 V, measurements were made and plotted.

As a result, it was found that the green luminance was greatly floated in the vicinity of a middle tone. The index maximum values in the range of 0 to 5 V under the individual conditions were described. All of the examples achieved an approximately 90% improvement in the floated luminance against Comparative Examples.

[2] Contrast Evaluation

It can be seen from Comparative Example <1> in FIG. 17 that contrast decreases with increasing ITO spacing.

Thus, it can be seen that Example 1 according to the embodiment is the most suitable for preventing the degradation in image quality and suppressing the contrast reduction.

EXAMPLE 2

Inorganic Material

FIG. 19 is a diagram showing the evaluation results of Example 2.

Instead of the alignment films composed of the organic material, inorganic alignment films were used. Although those typically formed by deposition, such as silicon, may be used, it seems to be possible to use a monomer or a mixture or a compound of the IV group element such as germanium, or alternatively, almost all materials usable for film formation by deposition.

Other examples thereof include materials having a siloxane skeleton formed by printing, spin coating, or ink jet method. The alignment films for the individual substrates were formed as follows.

The respective substrates were put in a vapor deposition apparatus, and $SiO_2$ was obliquely deposited on these substrates as the alignment film. Coating was performed to have a film thickness of approximately 50 nm. Thereafter, a seal pattern was formed expect for an injection port.

Image quality evaluations and contrast evaluations were conducted to the fabricated liquid crystal display devices.

In FIG. 19, the symbols "○", "Δ", and "×" in the CONTRAST column indicate "good", "permissible", and "unsatisfactory", respectively.

It is said that the inorganic alignment films have low anchoring energy and hence generally have weaker alignment control than polyimide.

In the evaluation results, the degradation in image quality due to contrast and alignment defect were more terrible. On the other hand, the liquid crystal panel of high quality and high image quality were obtained by employing the arrangement according to the embodiment.

Thus, in accordance with the present embodiment, by optimizing the ITO arrangement design, the abnormal alignment or like to be occurred in a certain pixel becomes less visible, thereby achieving high quality image.

More specifically, the degradation in image quality due to the lateral electric field is prevented by adapting so that the pixels aligned in the matrix form have different spacings between the pixels. Accordingly, in the liquid crystal display devices 1 and 1A, the abnormal alignment and the like occurred in a certain pixel become less visible, thereby providing high image quality.

The present invention provides a high-quality liquid crystal display device. In the projection type LCDs such as projectors, it becomes possible to achieve a high aperture ratio by reducing the panel size or enlarging the effective pixel area. This provides high productivity and high yield owing to the cell gap control. Material such as inorganic materials can be applied without degrading image quality, which leads a long lifetime.

The present invention is also applicable to a projection type display apparatus using a laser light source. This also produces the same advantages as in the foregoing embodiments.

It is noted that the specific forms and structures of the various parts and the numeric values indicated in each of the embodiments and the above numeral examples are merely given as examples for implementation of embodiments of the present invention. It is therefore to be understood that the technical scope of the present invention should in no way be limited by the above.

What is claimed is:

1. A liquid crystal display device comprising:
   a twisted nematic liquid crystal layer between substrates, pixel electrodes being on one of the substrates and an opposed electrode being on another of the substrates,
   wherein a green pixel is between an adjacent pixel and another pixel, a spacing in an alignment direction between said green pixel and said adjacent pixel being larger than any other spacing between said pixel electrodes.

2. The liquid crystal display device according to claim 1, wherein said pixel electrodes are transmissive to light.

3. The liquid crystal display device according to claim 1, wherein said opposed electrode and said pixel electrodes are arranged in a matrix.

4. The liquid crystal display device according to claim 1, wherein alignment films on said substrates align a liquid crystal of said liquid crystal layer in a predetermined direction.

5. The liquid crystal display device according to claim 4, wherein said liquid crystal has a refractive index anisotropy of not less than 0.10 at a room-temperature.

6. The liquid crystal display device according to claim 4, wherein said liquid crystal has a thickness of not more than 4 μm.

7. The liquid crystal display device according to claim 4, wherein said alignment films are composed of inorganic alignment films.

8. The liquid crystal display device according to claim 1, wherein a pixel unit comprises said green pixel, said adjacent pixel and another pixel.

9. The liquid crystal display device according to claim 1, wherein said adjacent pixel is a red pixel and said another pixel is a blue pixel.

10. The liquid crystal display device according to claim 9, wherein said spacing is larger than a spacing between said green pixel and a blue pixel.

11. The liquid crystal display device according to claim 9, wherein said spacing is larger than a spacing between said blue pixel and a different red pixel, said blue pixel being between said green pixel and said different red pixel.

12. The liquid crystal display device according to claim 1, wherein monochrome pixels have a pixel pitch of not more than 20 μm.

13. A projection type liquid crystal display apparatus comprising:
   the liquid crystal display device according to claim 1;
   a light source configured to emit light; and
   a light collecting optical system configured to divide said light into color lights, said color lights being guided into said liquid crystal display device,
   wherein each of said color lights has a different primary wavelength.

* * * * *